Feb. 27, 1923.
J. F. LEVENTHAL.
MOVING PICTURE OR ANIMATED DRAWING WITH DIRECTING INDICATOR.
FILED AUG. 9, 1921.
1,446,510.
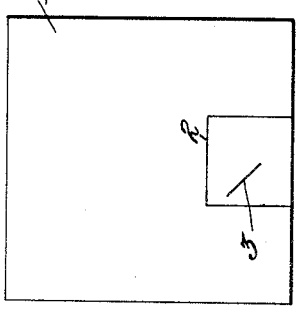
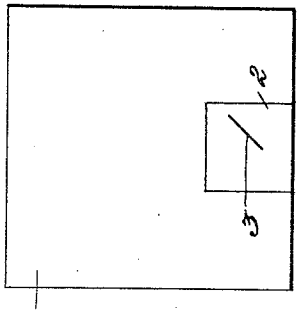
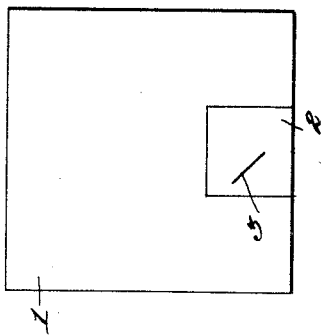
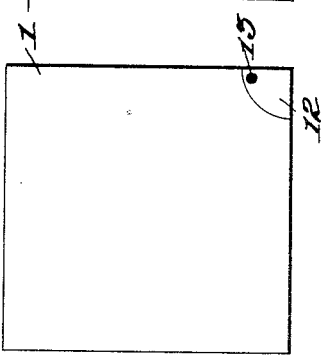
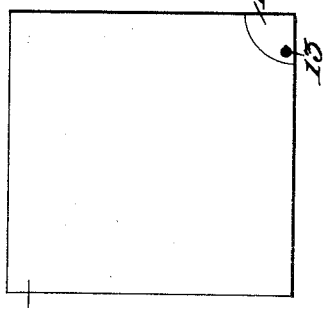
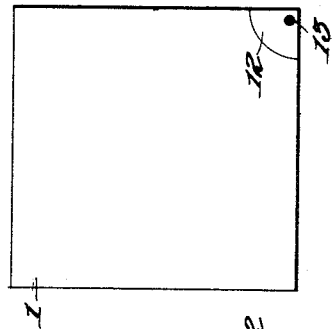
Inventor:
Jacob F. Leventhal,
by Wolfer Moore
Att'ys.

Patented Feb. 27, 1923.

1,446,510

UNITED STATES PATENT OFFICE.

JACOB F. LEVENTHAL, OF NEW YORK, N. Y.

MOVING PICTURE OR ANIMATED DRAWING WITH DIRECTING INDICATOR.

Application filed August 9, 1921. Serial No. 490,901.

*To all whom it may concern:*

Be it known that I, JACOB F. LEVENTHAL, a citizen of the United States, residing at New York, in the county of New York and State of New York, have invented certain new and useful Improvements in Moving Pictures or Animated Drawings with Directing Indicators, of which the following is a specification.

This invention relates to moving pictures or animated cartoons, and has for its object the provision of a means which will indicate to an animate intelligent performer, or performers, when to take predetermined actions with relation to the action of the picture or animated cartoon.

The action to be taken by the performers may be, for example, the playing of music, singing, speaking or the making of various sounds, gestures, or motions, or it may be any other desired action, or several of them simultaneously or consecutively.

The notices are given to the performers by indicators appearing on the picture projected on the screen, and are preferably of a very simple type, as the simpler they are the less space will they require. The exact type of notice may be varied to suit the requirements. When notices are to be given to musicians to indicate to them when to play music, that is, when the picture itself is to act to a certain degree as the leader of an orchestra, I prefer as the indicator, a baton, which has various positions on the screen corresponding more or less to the positions of an actual leader's baton. The baton may have as many positions without apparent motion as there are beats per bar, or it may have as many motions on the screen as there are beats per bar, this, of course, being subject to variation for the purpose of giving expression to the music in the well known manner; or the indicator may be of any other desired type.

In the drawings:

Fig. 1 is a more or less diagrammatic view of a picture having the indicator upon it as it appears on the screen.

Fig. 2 is a similar view showing the indicator in another position.

Fig. 3 is also a similar view showing the indicator in a following position.

Figs. 4, 5 and 6 are similar views of a series similar to that of Figs. 1, 2 and 3 but showing a modified type of indicator.

I usually reserve some suitable part of the picture 1, and preferably a small part, such for example, as that indicated at 2, for the indicator 3. This reserved portion 2 of the picture may be located in any suitable part of the picture, that shown in the drawings being merely by way of example. As the main action of the picture proceeds the indicator 3 will indicate to the animate performers, for example, the musicians, how to proceed in the playing of a piece, whereby the music played by them will be in substantially full accord with the action of the picture.

The pictures to be projected upon the screen are generally supported upon a long strip of film, although any other type of series of pictures may be used in the practice of my invention; and the indicator action, as well as the main action of the picture, may be produced upon the film or other series of pictures by direct photographic processes or by free hand drawings subsequently photographed thereupon, or by a process comprising features of both.

In the making of these pictures, the space 2 may be blocked off during the making of the main action leaving the space 2 blank to be afterward filled in by any of the methods above described, or the main action and indicator action may be produced upon the picture simultaneously; or under certain conditions the indicator action may be superposed on the main action.

Figs. 4, 5 and 6 represent a device similar to that above described. Therein the indicator space 12 may, if desired, be in a different portion of the picture 1, and the indicator may be of a different type, for example, a spot 13 having different positions.

In my copending case Serial No. 349726 entitled "Moving picture with accompaniment" filed January 6, 1920, I have described and claimed a moving picture or animated drawing having upon it a score for the direction of animate intelligent performers, either with or without indicators upon said picture or drawing; and in this application I intend to cover in the claims a moving picture or animated drawing consisting entirely of a main action and a directing indicator.

The expression "flat moving representation" as used herein is intended to include what is technically known as "moving pictures" or "animated drawings," or any other technical type of moving pictures.

I claim:

1. A support having thereon a series of images adapted to be projected, the successive images of the series showing, when suitably projected, a flat moving representation consisting entirely of a main action for amusing an audience and occupying the major portion of the representation, and of a simple indicating mark occupying different distinct positions in the minor part of the representation for directing an animate, intelligent performer to perform synchronously with the main action, the whole of the main action and the whole of the directing action being independent of each other, and there being no common action for both, the directing action occupying but a very small portion of the representation and being set apart from the main action, whereby the directing action does not distract the attention of the audience from the main action and thereby does not mar the amusing effect thereof.

2. A support having thereon a series of images adapted to be projected, the successive images of the series showing, when suitably projected, a flat moving representation consisting entirely of a main action for amusing an audience and occupying the major portion of the representation, and of a simple indicating mark having different distinct characteristics in the minor part of the representation for directing an animate, intelligent performer to perform synchronously with the main action, the whole of the main action and the whole of the directing action being independent of each other, and there being no common action for both, the directing action occupying but a very small portion of the representation and being set apart from the main action, whereby the directing action does not distract the attention of the audience from the main action and thereby does not mar the amusing effect thereof.

In testimony whereof I affix my signature.

JACOB F. LEVENTHAL.